July 11, 1939.  J. L. FORD  2,165,626
METER SETTER
Filed Jan. 27, 1937
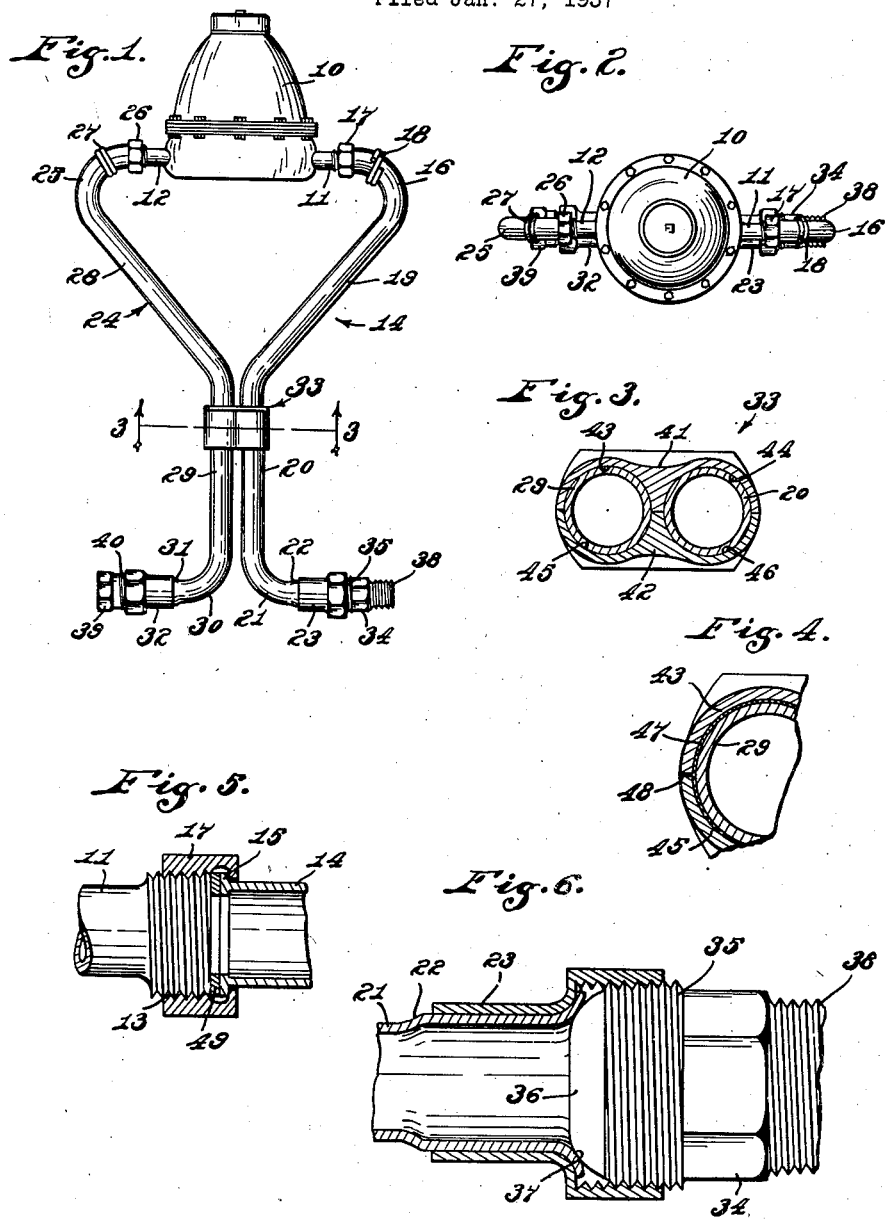
INVENTOR.
John L. Ford,
BY
Hood & Hahn.
ATTORNEYS.

Patented July 11, 1939

2,165,626

UNITED STATES PATENT OFFICE 2,165,626

METER SETTER

John L. Ford, Wabash, Ind., assignor to Ford Meter Box Company, Wabash, Ind., a corporation of Indiana Application January 27, 1937, Serial No. 122,534

3 Claims. (Cl. 285—3)

The present application relates to meter setters, and more particularly to devices for setting water meters above, or otherwise out of the line of, service mains; but it is to be noted that, although the invention is illustrated and described in association with a water meter, it may be used for positioning any fixture, having inlet and outlet, and adapted to be connected into a fluid line.

The primary object of the invention is to provide an improved organization of the general type illustrated and claimed in my prior Patent No. 1,988,003, issued January 15, 1935. Among the functions of the device of the present application, as compared with those of the device of my above-mentioned patent, are the simplification of the problems of manufacture and the problems of installation, the material reduction of manufacturing cost, and the elimination of an installation defect of the device of my above-mentioned prior patent. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a side elevation of a meter positioned by an embodiment of the present invention;

Fig. 2 is a plan view of the organization of Fig. 1;

Fig. 3 is an enlarged horizontal section taken substantially on the line 3—3 of Fig. 1 and looking in the direction indicated by the arrows:

Fig. 4 is a further enlarged fragmental section taken in the plane of Fig. 3;

Fig. 5 is a vertical section through one end of one conduit of the organization of the present application; and Fig. 6 is an enlarged vertical section through the other end of said conduit.

Referring more particularly to the drawing, it will be seen that I have illustrated a meter 10 provided with spuds or pipe ends 11 and 12 constituting the inlet and outlet thereof. As is illustrated in Fig. 5, the extremity of each of the spuds is threaded, as at 13.

A conduit 14, preferably formed of malleable copper, is flanged at one end, as at 15, for cooperation with the extremity of the spud 11; and adjacent that end, said conduit is bent or curved as at 16. A union element 17 is sleeved upon the conduit end 14 and is adapted to be threaded onto the extremity 13 of the spud 11 to provide a communicating connection between said conduit and said spud. A sealing washer 49 may or may not be used between the flange 15 and the end of the spud 11.

As is clearly to be seen in Fig. 5, the internal diameter of the union element 17 is somewhat greater than the external diameter of the conduit 14. Since the conduit 14 is substantially vertically positioned, it will readily be seen that, in the absence of means to prevent it, the union element 17 would be very likely to slide down the conduit approximately to the point 33, when released from the spud 11. In order to prevent such an occurrence, I wrap around the curved portion 16 of the conduit 14 a short coil of wire, as at 18; the diameter of said wire being at least greater than one half the difference between the external diameter of the conduit 14 and the internal diameter of the union element 17, said wire having a frictional engagement with the conduit to prevent movement of the wire along the conduit.

Below the curved portion 16, the conduit is formed with a portion 19 disposed at an acute angle to the axis of the body portion 20 of the conduit 14. At its lower end, the body portion 20, merges, through a curved portion 21, with the opposite end portion of the conduit 14.

A union element 23 having a rearwardly extending bearing sleeve, is mounted upon the lower end portion of the conduit 14. As is clearly illustrated in Figs. 1 and 6, the internal diameter of the sleeve of the union element 23 is considerably larger than the external diameter of the conduit 14; and, beyond the point 22, that portion of the conduit end which is normally received within the sleeve of the union element 23 is expanded to an external diameter substantially equal to the internal diameter of said union element sleeve.

Of course, it is desirable that the union element should fit snugly about the conduit end upon which it is mounted, in order that said union element may be guided into proper threaded association with the coupling with which it is to be associated. On the other hand, if the conduit end were of uniform diameter, the degree of movement away from the extremity of the conduit end toward the body portion, possible to the union element would be very slight, since it will be noted that the union element is positioned closely adjacent the curved portion 21 of the conduit. The provision of a union element of larger internal diameter, however, permits a greater degree of movement of the union element toward the body portion of the conduit; while the expansion of that section of the end portion normally within the union element sleeve provides the desired guiding bearing for the union element.

Associated with the conduit 14 is a second conduit 24 which, as will be readily perceived from an inspection of Fig. 1, is identical in shape with the conduit 14, but is oppositely positioned with respect thereto. Adjacent its upper end, the conduit 24 is curved as at 25, and the upper extremity of the conduit 24 carries a union element 26 which is prevented from displacement down the length of the conduit by a ring 27 similar to the ring 18. The intermediate portion 28 of the conduit leads from the curved portion 25 to the body portion 29, which body portion merges, at its lower end, through a curved portion 30, with the opposite end portion of the conduit 24.

A union element 32, identical with the element 23, and having a rearwardly extending bearing sleeve, is mounted upon the lower end portion of the conduit 24 which, as is indicated at 31, is expanded to fit the internal diameter of the element 32.

As will readily be perceived from a consideration of Fig. 1, the two body portions 20 and 29 of the respective conduits 14 and 24 are mounted in registering parallelism, and are held in that relation by a connector indicated generally by the reference numeral 33. If desired, a coupling 34, having a threaded end 35, may be connected to the conduit 14 by the union element 23; and preferably, the extremity of the element 34 will be part spherical, as at 36, for cooperation with the part spherical flared end 37 of the conduit 14. The opposite end of the coupling 34 may be threaded as at 38 for association with any desired element.

A coupling 39, likewise having a threaded end 40, may be connected to the end of the conduit 24 through the medium of the union element 32; the opposite end of coupling 39 being internally threaded. Obviously, the parts 34 and 39 may be interchanged, or either type of coupling may be used in association with both conduits 14 and 24; or either or both of the conduits 14 and 24 may be directly connected to a supply main without the interposition of any such coupling.

In Figs. 3 and 4, I have shown the details of construction of the connector 33. As is clearly shown therein, said connector comprises a pair of allochiral brass castings 41 and 42. The casting 41 is formed with two semi-cylindrical sockets 43 and 44 which, when the two castings 41 and 42 are mated, cooperate with similar semi-cylindrical sockets 45 and 46 in the casting 42 to form two cylindrical receptacles snugly receiving the body portions 20 and 29 of the conduits 14 and 24. To connect the two castings 41 and 42 rigidly together and to the conduit body portions, molten solder is poured into the very small clearances between the castings 41 and 42 and the body portions 20 and 29 of the conduits 14 and 24, in the manner illustrated in the enlarged view of Fig. 4. Thereby, an extremely thin film (somewhat exaggerated in the drawing) of solder is interposed as at 47 between the socket faces and the conduit portions embraced thereby; and a similarly thin film of solder is interposed, as at 48, between mating faces of the castings 41 and 42.

It will be seen that, in the organization illustrated in the present application, each of the conduits 14 and 24 is anchored, at the upper end of its body portion, to the other conduit. As a result, there is a certain amount of flexibility or resiliency in the length of conduit between the connector 33 and either end of either conduit which may, if necessary, be utilized in connecting the conduits in a line or to a fixture. Because of the disclosed arrangement, for instance, the lower end of either of the conduits may be subjected to distorting forces, and will be free to respond to such forces without affecting the opposite end of that conduit, or either end of the associated conduit. This result flows from the particular arrangement of the elements disclosed in the present application.

I claim as my invention:

1. The combination with a fixture having opposed pipes secured thereto, of a connector-support therefor comprising a pair of conduits, each conduit comprising a body portion and being formed at one end for communicating association with one of said pipes and at its opposite end for communicating association with another pipe, rigid means rigidly connected to both of said conduits intermediate the ends thereof to position the body portions thereof against relative axial movement, while leaving each end of each of said conduits free to respond to distorting forces without affecting the other end thereof or the other conduit, and means for securing each end of each conduit to a pipe.

2. In a device of the class described, a substantially vertical conduit having its upper end portion bent into a substantially horizontal position, a union element sleeved on said upper end and having an internal diameter, throughout its length, greater than the external diameter of said conduit, and a short coil of wire wrapped about the bent portion of said conduit, having frictional contact therewith.

3. In a device of the class described, a substantially vertical conduit having its upper end portion bent into a substantially horizontal position, a union element sleeved on said upper end and having an internal diameter, throughout its length, greater than the external diameter of said conduit, and a short coil of wire wrapped about the bent portion of said conduit, having frictional contact therewith, the diameter of said wire being greater than one-half the difference between the external diameter of said conduit and the internal diameter of said union element.

JOHN L. FORD.